United States Patent [19]
Gamble

[11] 3,848,216
[45] Nov. 12, 1974

[54] SOLID STATE KEYBOARD SWITCH

[76] Inventor: John G. Gamble, 24 Forest Hill Dr., Simsbury, Conn. 06070

[22] Filed: Oct. 9, 1973

[21] Appl. No.: 404,485

[52] U.S. Cl. .......... 338/32 H, 323/94 H
[51] Int. Cl. .......... H01c 7/16
[58] Field of Search ....... 338/32 R, 32 H; 323/94 H; 324/45, 46; 340/365 L; 335/1; 317/235 H

[56] References Cited

UNITED STATES PATENTS

| | | | |
|---|---|---|---|
| 3,668,596 | 6/1972 | Hubrich | 338/32 R |
| 3,676,819 | 7/1972 | Keller | 323/94 H X |
| 3,698,531 | 10/1972 | Bernin | 340/365 L X |
| 3,750,077 | 7/1973 | Nishiba | 338/32 R |
| 3,783,430 | 1/1974 | Nishiba et al. | 338/32 H |

*Primary Examiner*—C. L. Albritton

[57] ABSTRACT

A solid state switch is provided which embodies a push button mode of operation and which is capable of a variety of different types of uses. This switch includes a housing having a hollow interior and an open end wall formed at one end thereof communicating therewith, a push button supported at the other end of the housing for movement relative thereto, and a base configured so as to be mountable within the open end wall of the housing. A plurality of leads are mounted on the base so as to project outwardly therefrom on one side thereof while an upstanding slide guide is affixed to the other side of the base. A solid state switching element is suitably supported on the slide guide. The other components of the switch are supported by the base so as to be positioned within the hollow interior of the housing. In this connection, the switch further includes a retaining button which is operatively connected at one end to the push button so as to be movable therewith, and has the other end thereof positioned in engagement with a spring biased magnet carrier. The latter carrier has a hollow interior and supports a pair of magnets therewithin. In response to actuation of the push button, the magnet carrier is movable between a first position wherein the pair of magnets bear a first relationship to the solid state switching element thereby to establish a first operating condition of the switch, and a second position wherein the pair of magnets bear a second relationship to the solid state switching element thereby to establish a second operating condition of the switch.

10 Claims, 10 Drawing Figures

SOLID STATE KEYBOARD SWITCH

BACKGROUND OF THE INVENTION

It has long been known in the prior art to employ electrical switching devices for purposes of making, breaking, or otherwise changing the condition of the connections in an electrical circuit. Moreover, it will be readily apparent from a review of the teachings contained in the prior art that a number of advances have been made in electrical switch design throughout the years. Some of these advances have resulted from an attempt to improve the construction of the electrical switch in an effort to produce economies in the manufacture and/or assembly thereof. Other changes have stemmed from a desire to improve the efficiency of operation of the switch and/or to provide an electrical switch having a longer operating life.

More recently, particular attention has been directed to providing switches of the type commonly referred to by many in the art as noncontacting switches. The latter term is intended to refer to a switch where the switching action is accomplished through the use of solid state components, i.e., wherein an electronic output is produced in response to the mechanical translation of an input, rather than through the more conventional approach of moving one or more movable electrical contacts into engagement with one or more corresponding stationary electrical contacts. There are numerous reasons why this increase in the interest shown towards solid state switches has occurred. Apart from the fact that the technological progress which has been made in the techniques employed to manufacture solid state components has rendered the latter more competitive from an economic standpoint compared to the cost of manufacturing the components which are found embodied in an electrical switch, there are numerous advantages insofar as concerns operating characteristics which an electronic, i.e., solid state switch processes over an electrical switch, i.e., a switch having movable and stationary electrical contacts. In this regard, note is taken of the fact that solid state switches are not susceptible to contact wear as are electrical switches embodying movable and stationary electrical contacts. Accordingly, solid state switches have a longer operating life than do electrical switches. Also, another undesirable characteristic of electrical switches is that measures commonly have to be taken to prevent contacts thereof from chattering. This disadvantage is obviated in solid state switches by virtue of the fact that electrical contacts are not employed therein. In addition, electrical switches generally exhibit a greater sensitivity to factors such as vibration, humidity, etc. than do solid state switches.

One particular type of mode of operation which is utilized in solid state switches to achieve the desired switching action involves the use of displacement of magnetic field to vary the intensity of flux density to which a field sensitive solid state switching element is subjected thereby to cause the latter to produce an electronic output in response to changes in the flux density to which it is subjected. The employment of such switches has been limited heretodate however by the fact that such switches possess at least two significant limitations. The first of these is that such switches commonly require than an abrupt change in flux density occur in order to trigger an output therefrom. In the absence of a sharp change in flux density, the sensitivity of the switching element generally is not sufficient to trigger an output therefrom when a pre-established level of flux density, i.e., trigger point is reached. A second limitation possessed by prior art solid state switches of the aforedescribed type is that they generally have required that the movable member, through which the displacement of the magnetic field is accomplished, travel through a relatively long operating stroke. This obviously is an undesirable requirement inasmuch as it requires the size of the housing of the switch to be increased in order to accommodate such movement therewithin. The size of the housing in turn precludes the employment of such switches in many applications wherein size is a critical factor. In addition, in order to accomplish this relatively long stroke requires that the external force, through the application of which movement of the movable member is initiated, be applied for a longer period of time thereby affecting the speed of operation of the switch.

Thus, although solid state switches have been known in the prior art previously, there nevertheless has still existed a need for providing a solid state switch which obviates the requirement for utilizing an abrupt change in flux density to trigger the actuation of the field sensitive solid state switching element thereof as well as a solid state switch which does not require a long operating stroke of the movable member to provide the displacement of magnetic field. More specifically, a need has existed to provide a solid state switch which is not characterized by the fact that the flux density gradient is shallow and the rate of change of flux density displacement is low. Moreover, a need has existed to provide a solid state switch having a construction through which economies in the manufacture, assembly, and use thereof are achievable.

Accordingly, it is an object of the present invention to provide a solid state switch of the type wherein the displacement of a magnetic field is utilized to produce a change in flux density which in turn is employed to trigger an output from a field sensitive solid state switching element.

It is also an object of the present invention to provide such a solid state switch wherein a pair of magnets which are cross coupled by at least two pole pairs provide a standing magnetic wave of flux density for the length of travel of the magnets whereby the field sensitive solid state switching element is exposed to a varying flux density which the latter functions to threshold detect, switch and amplify to produce a useful electronic output therefrom.

It is another object of the present invention to provide such a solid state switch wherein control of the standing magnetic wave is provided thereby permitting more precise control to be exercised over the commit point in the stroke of the magnets whereat the field sensitive solid state switching element is triggered to produce an output.

A further object of the present invention is to provide such a solid state switch which is characterized in that only a relatively short operating stroke is required to trigger the field sensitive solid state switching element thereof to cause an output to be produced therefrom.

A still further object of the present invention is to provide such a solid state switch wherein the member through which movement of the magnets is produced is formed independently of the latter thereby obviating the need to ensure that axial alignment exists therebetween.

Yet another object of the present invention is to provide such a solid state switch wherein the operating components thereof are capable of being efficiently packaged together in a housing whereby to provide a switch which is characterized by its low mass, low profile and in which there is self shielding.

Yet another object of the present invention is to provide such a solid state switch which is relatively inexpensive to manufacture, is easy to assemble, and is reliable in operation.

SUMMARY OF THE INVENTION

It has now been found that the foregoing and related objects can be readily attained in a solid state switch which can be employed in a variety of different ways. The switch includes a housing which functions as a support for the components of the switch. Projecting outwardly from one end of the switch housing are a plurality of conductor leads operable for purposes of connecting the switch in an electrical circuit. The conductor leads are suitably connected in electrical circuit relation with a field sensitive solid state switching element which is fixedly mounted on a slide guide, the latter being supported on the housing so as to be positioned therewithin. There is also positioned within the housing a magnetic actuator. The latter magnetic actuator consists of a carrier and a pair of magnets mounted in the carrier. The magnetic actuator is mounted on the housing for movement relative to the slide guide. The switch also includes an externally accessible force applying member which is operatively connected to the magnetic actuator whereby a force applied to the aforementioned member is transmitted therethrough to the magnetic actuator to cause movement thereof. More particularly, in response to actuation of the externally accessible force applying member the magnetic actuator is movable between a first position wherein the pair of magnets bear a first relationship to the field sensitive solid state switching element to establish a first operating condition of the switch and a second position wherein the pair of magnets bear a second relationship to the solid state switching element thereby to establish a second operating condition of the switch.

In accordance with the preferred embodiment of the invention, a solid state switch has been provided which is particularly adapted to be employed in a keyboard. The externally accessible force applying member of the solid state switch comprises a mechanically isolated, push only push button which bears on the magnetic actuator to displace a magnetic field so as to expose the field sensitive solid state switching element to a varying flux density. Preferably the field sensitive solid state switching element comprises a Hall-effect semiconductor switch. The latter consists of a Hall generator, a trigger circuit establish a commit threshold, i.e., a trigger point and an amplifier circuit to bring the signal level to a usuable level. The Hall-effect semiconductor switch operates in response to exposure to a predetermined level of magnetic flux density. In accord with the preferred form of the invention, the flux density required to turn the Hall-effect semiconductor switch ON is 800 Gauss while 100 Gauss of the same polarity is sufficient to turn the Hall-effect semiconductor switch OFF. Thus, by moving the magnetic actuator which consists of a plastic carrier in which a pair of coacting, multi-polarity magnetized ceramic magnets are mounted, in a direction towards the fixedly mounted Hall-effect semiconductor switch, the latter is triggered to an ON condition when exposed to a flux density level of 800 Gauss. The magnetic actuator is spring biased whereby upon release of the push button the magnetic actuator is returned to its rest position under the influence of the action of the spring biasing means.

In accord with another embodiment of the invention, the magnetic actuator of the solid state is capable of being engaged by an externally accessible force applying member wherein the axis thereof through which the force is applied is displaced relative to the major axis of the magnetic actuator. Nevertheless, by virtue of the relationship which the magnetic actuator bears to the slide guide and more particularly the field sensitive solid state switching element fixedly supported thereon, it is still possible to achieve the desired mode of operation with the solid state switch by causing the magnetic actuator to move relative to the switching element. As a result, a solid state switch is provided which inherently possesses the capability of tolerating deviations in manufacturing tolerances and accordingly provides for an increased level of acceptance of components during manufacture thereby reducing the manufacturing costs of components measured as a function of the number of acceptable components produced to the total number of components manufactured.

In accord with a still further embodiment of the invention, a solid state switch has been provided which embodies a construction, insofar as concerns the push button and the magnetic actuator, which differs from that of the previously described embodiments. More specifically, a switch is provided wherein a separate retainer button is not utilized for purposes of operatively connecting the push button to the magnetic actuator. Instead, in accordance with this embodiment of the invention the push button consists merely of a cap which is mounted directly to the magnetic actuator. This is accomplished by providing the magnetic actuator with an elongated neck portion which extends outwardly from the body portion of the magnetic actuator. The push button cap has an opening formed internally therein which is suitably dimensioned so as to be capable of receiving therein with a sliding fit the free end of the aforedescribed neck portion of the magnetic actuator. The cap and the magnetic actuator are maintained in the assembled condition through the use of any suitable conventional securing means.

DETAILED DESCRIPTION OF THE ILLUSTRATED EMBODIMENTS

Figure 1:
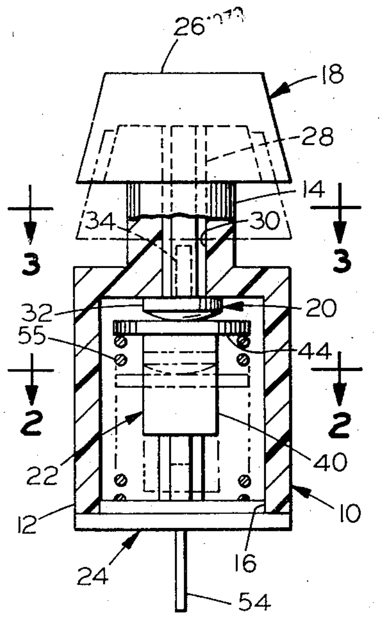
FIG. 1 is a side elevational view of a solid state switch constructed in accordance with the present invention.

Referring now to FIG. 1 of the drawings, there is illustrated therein a solid state switch, generally designated by reference numeral 10, constructed in accordance with the present invention. The switch 10 includes a housing 12 of generally rectangular configuration having an upstanding portion 14 formed integrally therewith at one end thereof, and having an open end wall 16 provided at the other end thereof. The switch 10 also includes an externally accessible force applying means which in accord with the illustrated embodiment of the switch 10 consists of a push button 18 and a retainer button 20, a spring biased magnetic actuator 22, and a base assembly 24.

The push button 18 as shown in FIG. 1 is supported on the housing 12 for movement relative thereto. More specifically, the push button 18 includes a substantially planar surface 26 against which an external force is brought to bear for purposes of causing the actuation of the switch 10 in a manner which will be described more fully subsequently. The push button 18 is also provided with a stem 28 which depends from and is formed integrally with the aforementioned planar surface 26. The stem 28 is suitably dimensioned so as to be capable of being received in the opening 30 provided for this purpose in the upstanding portion 14 of the housing 12. The retainer button 20 includes a mushroom-like head portion 32 which functions as a force applying surface and a stem 34 which is formed integrally with and extends outwardly from the substantially flat portion of the head portion 32. The stem 34 of the retainer button 20 is supported in an opening (not shown) provided for this purpose in the end of the stem 28 of the push button 18. The stem 34 of the retainer button 20 is maintained attached to the stem 28 of the push button 18 through the use of any conventional means of securing two members together such as, for example, by relying on the frictional engagement thereof, or by employing a suitable adhesive therebetween, etc.

Figure 3:
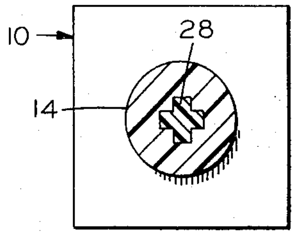
FIG. 3 is a cross sectional view of a push button and retainer button of a solid state switch constructed in accordance with the present invention, taken substantially along the line 3—3 in FIG. 1.

As best understood with reference to FIG. 3 of the drawings, the stem 28 of the push button 18 is preferably configured in the shape of a cross and the opening 30 is similarly configured. The dimensions of the opening 30 are slightly greater than the dimensions of the stem 28 whereby the latter is capable of being received therewithin thereby to permit the desired relative movement between the push button 18 and the housing 12 to be achieved. In this regard, it is to be noted that any tendency which the stem 28 might have to rotate relative to the side walls of the opening 30 as the former slides relative to the latter is resisted because of the nature of the construction of the stem 28 and the opening 30, i.e., the aforedescribed complementary cross-like configurations thereof.

Referring again to FIG. 1 of the drawings, as illustrated therein the magnetic actuator 22 consists of a magnet carrier 36, and a pair of coacting, multipolarity magnetized ceramic magnets 38. Further reference will be had hereinafter to the nature of the construction as well as the intended manner of operation of the magnets 38. The magnet carrier 36 is comprised of a body portion 40 which as best understood from the illustration thereof in FIG. 2 of the drawings embodies a first pair of substantially planar side walls **40*a* which are interconnected by a second pair of arcuate side walls 40*b*. For a purpose yet to be described, the body portion 40 has an opening 42 formed at the approximate center thereof. The opening 42 in accord with the illustrated embodiment of the invention extends substantially the entire length of the body portion 40. At one end thereof, the body portion 40 is provided with an outwardly extending flange 44 formed as an integral part of the body portion 40**.

Figure 2:
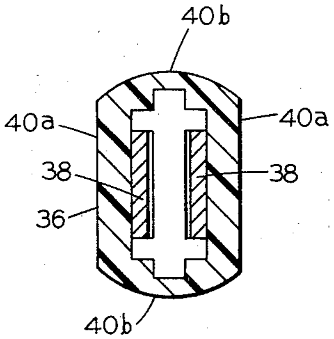
FIG. 2 is a cross sectional view of the magnetic actuator of a solid state switch constructed in accordance with the present invention taken substantially along the line 2—2 in FIG. 1.

As depicted in FIG. 2 of the drawings, the opening 42 in body portion 40 has a substantially H-like configuration. More specifically, the opening 42 is formed by a slot which lies in a plane that extends at right angles to the major axis of each of the arcuate side walls **40*b*, and a pair of slots which are provided adjacent the ends of the aforementioned slot as as to extend at right angles thereto. The latter mentioned pair of slots are suitably spaced relative to each other so as to permit the magnets 38 to be received therebetween. The magnets 38 are retained in the aforementioned position through the use of any suitable conventional securing means. In this regard, although now shown in the drawings in the interest of maintaining clarity of illustration, the magnets 38 are preferably positioned in a pair of cutouts suitably configured so as to conform to the external dimensions of the magnets 38. The cutouts (not shown) are formed in the interior of the body portion 40 in opposed relation relative to each other along the major axis of the opening 42. However, it is to be understood that other means could equally well be employed for mounting the magnets 38 within the magnet carrier 36**.

Figure 5:
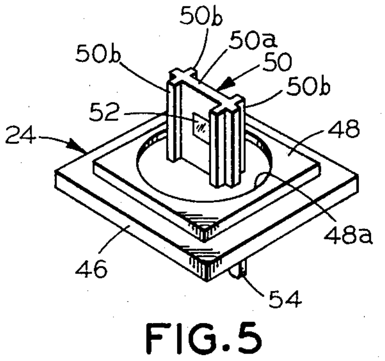
FIG. 5 is a perspective view of a base assembly of a solid state switch constructed in accordance with the present invention.

Continuing with a description of the components embodied in the solid state switch 10, reference will now be had to FIG. 5 of the drawings and more particularly the nature of the construction of the base assembly 24 illustrated therein. The base assembly 24 includes a base 46, a member 48 which functions as a spring seat, and a slide guide 50. The base 46 comprises a substantially planar member the dimensions of which correspond to the external dimensions of the housing 12 measured adjacent the open end wall 16 thereof. The base 46 in a manner best understood with reference to FIG. 1 of the drawings functions as a closure member for the open end wall 16 of the housing 12. The base 46 may be secured to the housing 12 through the use of any suitable conventional securing means (not shown) such as through the use of an adhesive, threaded fasteners, etc.

The configuration of the member 48 corresponds to the external shape of the base 46. However, dimensionally the member 48 is smaller in area than the base 46. As such, when the base 46 is mounted on the housing 12, the member 48 is received within the open end wall 16. In accord with the preferred embodiment of the invention, the member 48 is formed integrally with the base 46. The central portion 48*a* of the member 48 is preferably cut away for a purpose yet to be described.

The slide guide 50 has a generally H-shaped configuration. More particularly, slide guide 50 consists of an elongated member 50*a* having ribs 50*b* projecting outwardly therefrom at right angles thereto adjacent each end thereof. The external configuration of the slide guide 50 thus corresponds to the configuration of the opening 42 whereby the slide guide 50 is capable of being inserted into the opening 42 for movement therewithin in a manner which will be described more fully hereinafter. Slide guide 50 is supported on the base 46 at approximately the center thereof and in addition is also preferably centered within the cut away portion 48*a* of the member 48. In accord with the illustrated embodiment of the invention the slide guide 50 is formed integrally with the base 46. However, it is to be understood that if so desired, slide guide 50 could take the form of a separate member.

Mounted in the slide guide 50 in an opening (not shown) suitably provided therefor is a field sensitive solid state switching element 52. The switching element 52 is preferably supported on the elongated member 50*a* so as to be positioned intermediate the ribs 50*b* of the slide guide 50 and so as to be substantially equally spaced from the side edges of the slide guide 50. In accord with the preferred form of the invention, the switching element 52 comprises a Hall-effect semiconductor switch. The latter semiconductor switch consists of a Hall generator, a trigger circuit to establish a commit threshold, i.e., a trigger point, and an amplifier circuit to bring the signal level to a usable level. All of the components of the Hall-effect semiconductor switch 52 are embodied on a chip which in turn is mounted, in the manner which has been described hereinabove on the slide guide 50. Such chips are presently commercially available from the Spargue Electric Company and the Microswitch Division of Honeywell Company. Although not shown in the interest of maintaining clarity of illustration, the switching element 52 in a manner well known to those skilled in the art is suitably connected in electrical circuit relation with a plurality of conductor leads 54. The latter conductor leads 54 are supported through the use of any suitable conventional securing means on the base 46 so as to be positioned in substantially equally spaced relation relative to each other approximately in the center of the base 46 and so as to be externally accessible whereby to enable connections to be made thereto to permit the solid state switch 10 to be connected in an electrical circuit.

Figure 6:
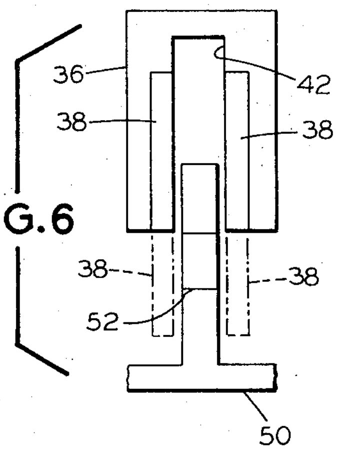
FIG. 6 is a schematic representation of the magnetic actuator and slide guide of a solid state switch constructed in accordance with the present invention, illustrating in solid lines the relative positions thereof when the solid state switch is in the OFF condition and illustrating in dotted lines the relative positions thereof when the solid state switch is in the ON condition.
Figure 4:
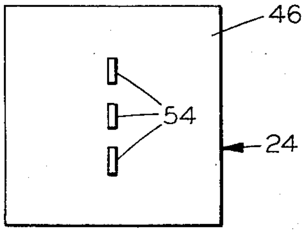
FIG. 4 is a bottom view of a solid state switch constructed in accordance with the present invention.

The Hall-effect semiconductor switch 52 depends for its operation on the principle that a magnetic field can be employed for purposes of causing a change in the distribution of the current in a strip of metal. More specifically, the Hall-effect may be defined as comprising the situation wherein a cross e.m.f. is generated by the movement of electrons through a magnetic field. This e.m.f. is superimposed upon and is in addition to the electrical field which is generated along a conductor by virtue of the I.R. drop. In accordance with the Hall-effect, an electrical field is set up across the width of a conductor if a flat conductor carrying a current is placed in a magnetic field of a given density directed normal to the flat surface of the conductor. Thus, by moving the magnetic actuator 22 and thereby the coacting magnets 38 mounted thereon in a downwardly direction, as viewed with reference to FIGS. 1 and 6 of the drawings, i.e., towards the Hall-effect semiconductor switch 52 the latter can be exposed to a level of flux density sufficient to establish a commit threshold operable to trigger the switch 52 to an ON condition. In accord with the illustrated embodiment of the invention, the magnetic actuator 22 is returned to its uppermost position as viewed with reference to FIG. 1 of the drawings, i.e., is spring biased thereto by means of spring 55. The latter spring 55 is supported within the housing 12 with one end thereof seated on the member 48 and with the other end thereof in engagement with the under surface of flange 44.

Turning now to a description of the nature of the magnets 38 and the manner in which they function, it is known that with a conventional "bar" magnet the flux field which results from the permanent magnet alignment of hard magnetic material includes an external field which is considered to be equal in flux to that of the internal field. Accordingly, it follows that the flux density must vary inversely with the cross sectional area. This is particularly important insofar as concerns Hall-effect devices inasmuch as such devices respond to flux density rather than flux. In this regard, it should be noted that so-called hard steel magnets and ALNICO magnets require a high length to diameter ration in order to support an external field against degaussing, i.e., demagnetizing influence. On the other hand, a "horseshoe" magnet is a configuration which tends to increase flux and flux density by reducing the flux path through the air and consequently the magnetic circuit reluctance. However, it should be noted that here also the length of the magnet is still great with respect to the cross section of the iron or ALNICO. With a "horseshoe" magnet the external field is not only concentrated, but directed, thereby increasing the field intensity/weight of magnet ratio.

In contrast to the above, in a barium ferrite, i.e., ceramic magnet or a ferrite filled PVC magnet or a plastic or ferrite filled rubber magnet in which ferrite particles are suspended in either an oriented or unoriented fashion, the length to cross sectional area is reversed in ratio. This reflects the higher coercive force of the ferrite, which enables a shorter magnet to support an external flux field against degaussing influences such as reversing fields, shock, thermal changes, etc. When two such ferrite type magnets are placed in polar alignment, the NI, i.e., ampere turns equivalent or $H_c$, i.e., coercive forces are additive. This spatial arrangement tends to concentrate the coupling field between them as the external field attracts opposite poles. The "return path" loops freely through the surrounding space, coupling the outward magnetic faces. This latter circuit is of high reluctance and the resulting flux density across the internal gap, i.e., between the magnets, is somewhat lower than if these faces were connected by a ferromagnetic "return path"; since circuit flux is inversely proportional to the circuit reluctance and directly proportional to the NI or $H_c$ of the magnet.

Figure 8:
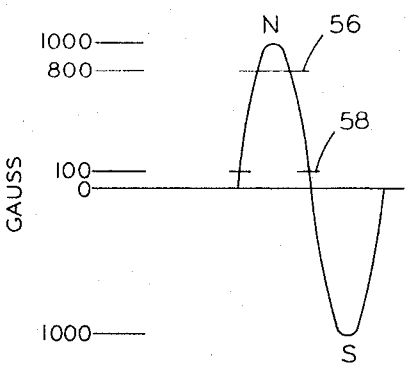
FIG. 8 is a graphical illustration of the analog variation of flux density vs. displacement for a two pole pair of coupled magnets.

In accord with the illustrated embodiment of the invention, the Hall-effect semiconductor switch 52 is triggered as a result of the movement relative thereto of two, three pole ferrite magnets 38. FIG. 8 of the drawings is an illustration of the analog variation of flux density measured in Gauss vs. displacement of a two pole pair of coupled magnets with typical values for the magnets denoted thereon. In addition, there is noted on the graph illustrated in FIG. 8 the respective Gauss levels at which threshold detection and dropout occur for the Hall-effect semiconductor switch 52. The latter levels are identified by the lines designated by reference numerals 56 and 58, respectively.

Figure 9:
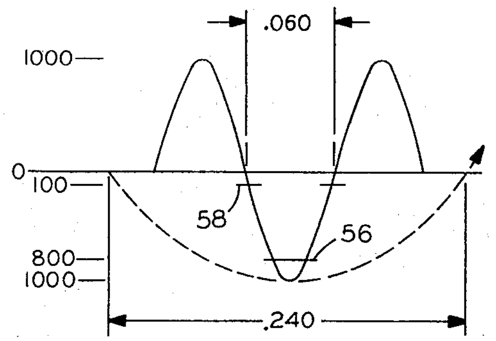
FIG. 9 is a graphical illustration of flux density measured in Gauss vs. displacement in inches depicting the length of stroke required to trigger the switching element of a solid state switch constructed in accordance with the present invention and that required to trigger the switching element in a typical prior art form of solid state switch.

The length of the stroke through which the magnetic actuator 22 must travel in order to effectuate the triggering of the Hall-effect semiconductor switch 52 is representatively illustrated in FIG. 9 of the drawings by means of the graph, in which flux density measured in Gauss vs. displacement measured in inches is plotted, which is depicted therein. Thus, as shown in FIG. 9, it has been found that the solid state switch 10 is capable of being actuated, i.e., the Hall-effect semiconductor switch 52 thereof may be triggered in response to the movement of the magnetic actuator 22 through a stroke of 0.060 inches. Referring to the dotted line which is superimposed on the graph of FIG. 9, it can be seen therefrom that in contrast to the relatively short operating stroke required to actuate the solid state switch 10 constructed in accordance with the present invention a much longer operating stroke of 0.240 inches is commonly required to actuate the prior art forms of solid state switches.

There will not be set forth a description of the mode of operation of the solid state switch 10. In response to the application of an external force to the planar surface 26 of the push button 18, the latter is caused to move downwardly as viewed with reference to FIG. 1 of the drawings against the upward force being provided by spring 55. More specifically, the external force applied to push button 18 is transmitted through the retainer button 20, which is fixedly secured thereto so as to be movable therewith, to the upper end of the magnetic actuator 22 causing the latter to move relative to the slide guide 50. Thus, the effect of moving the magnetic actuator 22 which consists of the magnet carrier 36 in which the pair of coacting, multi-polarity magnetized ceramic magnets 38 are fixedly supported is to cause the displacement of a magnetic field so as to expose the Hall-effect semiconductor switch 52 to a varying flux density. In accord with the illustrated embodiment of the invention, the flux density required to cause the Hall-effect semiconductor switch 52 to turn ON is 800 Gauss while the flux density level of 100 Gauss is sufficient to turn the Hall-effect semiconductor switch 52 OFF. Therefore, when the magnetic actuator 22 has traveled downwardly approximately a distance of .060 inches from its rest position, the Hall-effect semiconductor switch 52 is caused to be exposed to flux density level of 800 Gauss which corresponds to the commit threshold of the Hall-effect semiconductor switch 52 with the result that the latter is triggered. Upon removal of the external force which has been applied to the push button 18, the magnet carrier 36 and therefore the magnets 38 are moved under the influence of the fore being applied thereto by the spring 55 to the rest position of the components of the solid state switch 10, i.e., to the respective positions thereof depicted in solid lines in FIG. 1 of the drawings. In accord with the illustrated embodiment of the invention, the cutout portion 48*a* formed in the member 48 is provided for purposes of enabling the bottom end portion of the magnet carrier 36 to be received therein as the magnetic actuator 22 moves downwardly.

Figure 7:
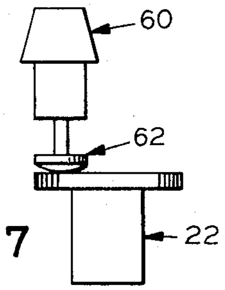
FIG. 7 is a side elevational view of the externally accessible force applying member and magnetic actuator of another embodiment of solid state switch constructed in accordance with the present invention wherein the axis of the force applying member through which the force is applied is displaced relative to the major axis of the magnetic actuator.

In accord with the embodiment of the invention illustrated in FIGS. 1–6 of the drawings, the center line of the push button 18 is axially aligned with the center line of the magnetic actuator 22. However, as shown in FIG. 7 of the drawings, in accord with another embodiment of the invention, it is also possible to provide a solid state switch embodying a construction wherein movement is imparted to magnetic actuator 22 in response to a force transmitted thereto by an externally accessible force applying means consisting of a push button 60 and a retainer button 62, the center line of each of which is displaced axially from the center line of the magnetic actuator 22. This is feasible because of the nature of the structures of the magnetic actuator 22 and the slide guide 50 which permits the latter two elements to cooperate in such a manner that during relative movement therebetween, the magnetic actuator 22 is guided relative to the slide guide 50 so that no unbalanced force is applied thereto which could lead to damage thereto.

Figure 10:
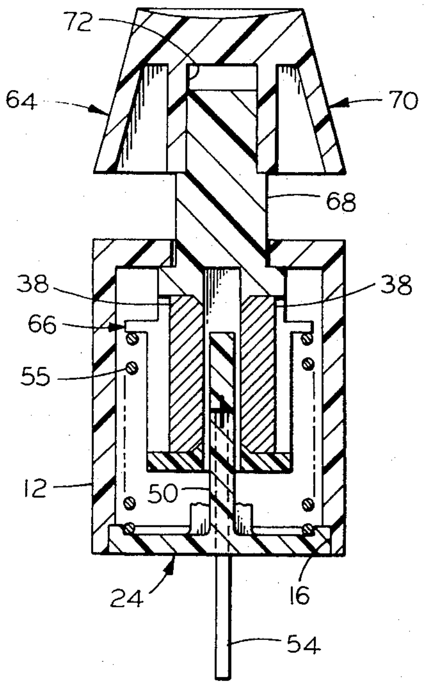
FIG. 10 is a cross sectional view of another embodiment of a solid state switch constructed in accordance with the present invention.

Referring now to FIG. 10 of the drawings, there is illustrated therein another embodiment of a solid state switch, generally designated by reference numeral 64, constructed in accordance with the present invention. The primary difference between the switch 64 illustrated in FIG. 10 and the solid state switch 10 shown in FIG. 1 resides in the manner in which the respective force applying means is operatively connected to the corresponding magnetic actuator of the switch. For purposes of the description of the construction of the switch 64 which follows hereinafter, those components of the switch 64 which have a construction and mode of operation which is substantially the same as that of a similar component which is embodied in the switch 10 have been designated in FIG. 10 in the interest of maintaining clarity of understanding with the same reference numeral which has been applied to the component in the switch 10. Proceeding with a description of the construction of the switch 64, the latter includes a housing 12 having a hollow interior, and an open end wall 16 at one end thereof communicating with the hollow interior. A base assembly 24 is provided which is configured so as to be mountable within the open end wall 16 of the housing 12. A plurality of leads 54 are mounted on the base assembly 24 so as to project outwardly therefrom on one side thereof while an upstanding slide guide 50 is affixed to the other side of the base assembly 24. A solid state switching element (not shown) similar to the switching element 52 of the switch 10, is suitably supported on the slide guide 50.

The other components of the switch 64 are supported by the base assembly 24 so as to be positioned within the hollow interior of the housing 12. In this connection, the switch 64 further includes a magnetic carrier 66 which is spring biased by coil spring 55 to the position thereof depicted in FIG. 10 of the drawings which corresponds to the rest position of the switch 64. The latter carrier 66 has a hollow interior and supports a pair of magnets 38 therewithin. It is to be noted that in contrast to the structure of the switch 10, the siwtch 64 does not embody a retainer button. Instead, in the switch 64 the magnetic carrier 66 is provided with an elongated neck portion 68 which projects outwardly from the body portion of the magnetic carrier 66. In accord with the illustrated embodiment of the switch 64, the neck portion 68 is preferably formed as an integral part of the magnetic carrier 66. Moreover, the push button 70 which in the switch 64 takes the form of a cap is mounted directly on the free end of the neck portion 68 of the magnetic carrier 66. For this purpose, the push button 70 has formed therein substantially at the center thereof an opening 72 which is suitably dimensioned so as to be capable of receiving the neck portion 68 of the magnetic carrier 66. The push button 70 is maintained mounted to the magnetic actuator 66 through the use of any suitable conventional securing means such as adhesive, frictional engagement between the parts, etc. The mode of operation of the switch 64 is such that in response to actuation of the push button 70, the magnet carrier 66 is movable between a first position wherein the pair of magnets 38 bear a first relationship to the solid state switching element thereby to establish a first operating condition of the switch 64, and a second position wherein the pair of magnets 38 bear a second relationship to the solid state switching element thereby to establish a second operating condition of the switch.

The solid state switch 64 is particularly adapted for employment in keyboard applications wherein it is desirable to be able to provide a switch which is actuatable in response to the sensing of a discrete commit point. More specifically, the switch 64 is uniquely adapted for employment in situations wherein advantages flow from being able to provide a solid state switch, the actuation of which is accomplished by means of a linear actuated, cross-coupled multi-polar magnetized field signal source, and wherein the possibility of misalignment existing between the force applying means and the magnetic actuator is at a minimum. Secondly, it is possible with the solid state switch 64 to achieve economies of manufacture inasmuch as the neck portion 68 of the magnetic carrier 66 can be dimensioned so as to be capable of receiving push button caps which are presently commercially available thereby obviating any necessity to expend large sums of money to purchase new tooling, etc. for purposes of purchasing new caps limited in their applicability solely to solid state switches of the type illustrated in FIG. 10. In addition, further economies may be achieved by virtue of the fact, that the push button caps 70 may be made interchangeable such that in keyboard applications wherein commonly each push button cap 70 would be provided with a different alpha-numeric identification, when changes are required to be made in the identification carried by the push button caps 70 the later which need to be changed are easily removed and a substitution made therefor. This eliminates any need to stock a large inventory of complete switches, the only difference therebetween being the identification which appears on the cap 70, since merely stocking an assorted selection of caps will generally be sufficient to accommodate the aforedescribed changes. Finally, for some applications the length of the neck portion 68 of the magnetic carrier 66 may vary. For example, certain product applications may require the greatest possible length/diameter ratio for bearing alignment to prevent binding from occurring during the translation of the push button. This is easily accommplished in the switch 64 merely by varying the length of the neck portion 68 of the magnetic carrier 66. As long as the diameter of the neck portion 68 and the diameter of the free end thereof remain as illustrated in FIG. 10 of the drawings, the length of the neck portion 68 may be varied with the neck portion 68 still being capable of passing through the opening provided therefor in the housing 12 and of having the push button cap 70 mounted on the free end of the neck portion 68.

Although three embodiments of a solid state switch constructed in accordance with the present invention have been shown in the drawings and described hereinabove, it is to be understood that modifications in the construction thereof may be made thereto by those skilled in the art without departing from the essence of the invention. In this regard, some of the modifications which can be made in the solid state switch 10 have been alluded to hereinabove while others will become readily apparent to those skilled in the art when exposed to the present description and illustration of the construction of the solid state switch 10. Thus, for example, it has been set forth hereinabove that in accord with the illustrated embodiment of the invention two magnets are mounted within the magnet carrier thereby to provide a magnet carrier consisting of three separate elements. In addition, it has been set forth that in accord with the preferred form of the invention a three pole pair, cross-coupled magnetization is utilized for purposes of causing the Hall-effect switch to be exposed to a varying flux density. However, it is also possible without departing from the essence of the present invention to form the magnetic actuator as a single composite structure. More specifically, if so desired, the plastic magnet carrier 36 and the two ceramic magnets 38 held in the plastic carrier 36 could be combined to form a composite structure of one piece construction, which is fabricated of a high density dispersion of barium ferrite or other permanent magnetic material in a plastic substrate. A desirable feature of such an approach resides in the fact that since three elements are combined into one there is an accompanying reduction in the cost of fabrication and assembly of the solid state switch. This is accomplished while posing no particular problem in effecting a saturation magnetization level in the increased resolution. Thus, there would be provided a solid state switch comprised of only six parts with all but the spring and Hall-effect switch being moldable. As a consequence, a further reduction in the cost of manufacture of the solid state switch could be achieved.

In addition, in the illustrated embodiment of the invention, the externally accessible force applying means has been depicted as consisting of a push button and a retainer button. However, when employing a solid state switch constructed in accordance with the present invention in other applications other than in keyboards, it may be found desirable to employ some other form of externally accessible force applying means. Such means where desirable could be substituted for the illustrated push button and retainer button without departing from the essence of the invention. In this connection, some of the alternate forms of externally accessible force applying means which are contemplated include, but are not limited to, a lever as in a limit switch, a cam actuator for timing switches where the self-shielding feature is necessary and/or the application can not tolerate swinging a magnet as in a situation where the dwell in degrees must represent precise position and can not be used as a "one shot" since it must also monitor time at this discrete position, etc.

In the event the aforedescribed composite magnitized plastic magnet which reduces three components to a single source which is spring biased and slides upon bearing surfaces of the slide guide is employed in the solid state switch, the magnetic carrier receives the input from the externally accessible force applying means in addition to functioning as the "magnets" magnetized in a cross coupled pattern. The structure of the solid state switch is thus reduced to three structures performing the several functions of force input surface, magnet carrier with a slide surface bearing upon the slide guide, the slide guide with electronic sensor and leads, and a spring for returning the magnetic signal source to an initial preactuated position, two cross coupled magnets within the carrier to provide a standing magnetic wave of varying flux density for the length of its actuating translation to expose the Hall-effect detector to a varying flux density which will threshold detect, switch, and amplify as a useful electrical output.

Also, in accord with the illustrated embodiment of the invention, the solid state switch 10 has been depicted in the form desired for employment in a keyboard type application. As such, the solid state switch 10 has been shown as including a housing 12. However, it is to be understood that for some applications the housing 12 could be eliminated without departing from the essence of the invention. For example, such a housing is neither necessary nor in most instances useful when a cam input or lever input is employed for actuating the solid state switch. Either of the latter input means could have their own encasement or housing as dictated by a particular application.

In addition, although the spring 55 in accord with the illustrated embodiment of the invention acts directly upon the magnet carrier 36, it is, of course, to be understood that if the magnetic actuator comprises a composite structure of one piece construction, the spring 55 would act on the essentially homogeneous composite input component rather than upon the carrier which in turn causes the supported magnets to translate. It is also contemplated that without departing from the essence of the invention, the spring 55 may be made to act directly on the magnets and therethrough on the magnet carrier in order to provide the desired return movement of the latter. However, it should be recognized tbat there is a packaging advantage to be derived from having the spring contact the carrier near its top. Namely, this permits a longer compression spring to be employed which in turn permits a flatter spring rate, i.e., a lower spring rate. This advantage, of course, exists whether the magnetic actuator comprises a composite structure or is composed of a plurality of discrete elements.

Although not depicted in the drawings, for some applications it may be found desirable to provide the solid state switch with means operable to lock the switch in an actuated condition. Such means may comprise some form of mechanical interlock requiring a positive unlatching thereof, or an electrical interlock wherein a "set-reset" electronic element is actuated by the same switch, as a flip-flop.

In view of that set forth above, it should be readily apparent that the magnetic field intensity varying mechanism which is embodied in the solid state switch constructed in accordance with the present invention is capable of being employed to actuate any electronic probe, i.e., switching element which is responsive somewhat linearly to exposure to a source of changeable magnetic intensity. Preferably this response is somewhat proportional but not necessarily since thresholding is occurring to produce a digital output from an analog exposure. Accordingly, although the field sensitive solid state switching element has been identified as comprising a Hall-effect semiconductor switch, the former may also comprise magneto-resistors, etc. without departing from the essence of the invention. Moreover, it is also conceivable that in some switch application it may be desirable to actuate an analog probe and scan to sense amplitude rather than to trigger a digital output from the switching element 52.

It can therefore be seen that in accord with the present invention in the solid state switch 10, a mechanically isolated push only button bears on a spring loaded magnetic actuator to displace a concentrated magnetic field so as to expose the Hall-effect switch to a varying intensity of flux density. Upon release of the push button, the spring loaded actuator returns to its initial rest position. A pair of coacting, multi-polarity magnetized ceramic magnets, with a plastic carrier, comprise the magnetic actuator, and provide complete flux polarity reversal so as to increase the field gradient and thus the displacement rate of change of flux density, in proximity to the Hall-effect switch. The translation of the actuator assembly is guided upon the solid guide so as to maintain precise and consistent field intensity at any given displacement. The isolation of the push button in its bearing from the actuator in its bearing prevents binding due to misregistration of bearing surfaces at assembly. This may be best understood by reference to FIG. 1 of the drawings, wherein it is illustrated that the push button is trapped within the bearing of the housing while the slide guide on which the Hall-effect switch is mounted is formed either integrally as a part of the base assembly or is separately affixed to the base. Thus, the situation could obviously exist where there might be two slightly askew axes required to conform to a common axis if the components were not thus isolated. The alternative to the above construction and that which is to be found embodied in the prior art forms of solid state switches is to provide an excessive clearance about the field sensitive solid state switching element and use but one bearing surface, i.e., one for the push button.

In addition, the advantages possessed by a solid state switch constructed in accordance with the present invention reside in the consistency of magnetic switching, and in the independence insofar as concerns variations in axial alignment of the push button and the axis of translation of the magnet carrier. There is manufacturing "forgiveness" in the design which increases the successful product yield, and thus decreases the real cost involved in component production. Tolerances may be held close in the slide bearing mating of the slide guide and magnet carrier, yet there is a freedom from hang up or binding in driving this assembly with an uncoupled push button. In contrast, in prior art forms of solid state switch construction the push button is also the magnet carrier. Accordingly, the magnets require a greater clearance to assure a no bind condition in actuation. This, of course, causes the magnetic intensity to be reduced.

Thus, it can be seen that the present invention provides a novel and improved solid state switch of the type wherein the displacement of a magnetic field is utilized to produce a change in flux density which in turn is employed to trigger an output from a field sensitive solid state switching device. The solid state switch of the present invention includes a pair of magnets which are cross coupled by at least two pole pairs providing a standing magnetic wave of flux density for the length of travel of the magnets whereby the field sensitive solid state switching element is exposed to a varying flux density which the latter functions to threshold detect, switch and amplify to produce a useful electronic output therefrom. Moreover, in accord with the present invention a solid state switch is provided wherein control of the standing magnetic wave is provided thereby permitting more precise control to be exercised over the commit point in the stroke of the magnets whereby the field sensitive solid state switching element is triggered to produce an output. The solid state switch of the present invention furthermore is characterized in that only a relatively short operating stroke is required to trigger the field sensitive solid state switching element thereof to cause an output to be produced therefrom. In accordance with the present invention a solid state switch is provided wherein the member through which movement of the magnets is produced is formed independently of the latter thereby obviating the need that axial alignment exists therebetween. In addition, the solid state switch of the present invention is characterized by the fact that the operating components thereof are capable of being efficiently packaged together in a housing whereby to provide a switch which is characterized by its low mass, low profile and in which there is self-shielding. Finally, in accord with the present invention a solid state switch is provided which is relatively inexpensive to manufacture, is easy to assemble and is reliable in operation.

Having thus described the invention, I claim:

1. A solid state switch operable for accomplishing an electrical switching function comprising:

a. housing means having a plurality of side walls interconnected to form a hollow chamber therebetween;

b. externally accessible terminal means supported on said housing means operable for connecting the solid state switch in electrical circuit relation in an electrical circuit;

c. guide means mounted on said housing means and extending inwardly into said hollow chamber;

d. a field sensitive switching element mounted on said guide means operable in response to exposure to changes in magnetic flux density to produce corresponding electrical outputs;

e. magnetic actuator means supported in said hollow chamber of said housing means and having an opening formed at least partially therethrough for receiving at least a portion of said guide means therewithin, said magnetic actuator means including magnetic means positioned thereon with at least a portion of said magnetic means located on either side of said opening in said magnetic actuator means, said magnetic means comprising at least two cross coupled magnetic pole pairs operable to produce a standing magnetic wave; and f. force applying means operatively connected to said magnetic actuator means and actuatable for producing relative movement between said magnetic actuator means and said guide means wherein when said guide means in response to actuation of said force applying means occupies a first position relative to said opening in said magnetic actuator means said magnetic means bears a first relationship to said field sensitive switching element thereby exposing said field sensitive switching element to a first level of magnetic flux density to establish a first operating condition of said field sensitive switching element thereby causing a first form of output to be provided from the solid state switch, and when said guide means in response to the unactuation of said force applying means occupies a second position relative to said opening in said magnetic actuator means said magnetic means bears a second relationship to said field sensitive switching element thereby exposing said field sensitive switching element to a second level of magnetic flux density to establish a second operating condition of said field sensitive switching element thereby causing a second form of output to be provided from the solid state switch.

2. The solid state switch as set forth in claim 1 wherein said housing means comprises a housing having an open end wall formed at one end thereof and an outwardly extending projection having an opening formed therein provided at the other end thereof, and a base assembly mountable in said open end wall of said housing to provide a closure therefor.

3. The solid state switch as set forth in claim 2 wherein said externally accessible terminal means comprises a plurality of conductor leads supported on and extending outwardly from said base assembly.

4. The solid state switch as set forth in claim 2 wherein said guide means comprises a slide guide fixedly mounted on said base assembly and extending outwardly therefrom substantially at right angles thereto.

5. The solid state switch as set forth in claim 4 wherein said field sensitive switching element comprises a Hall-effect semiconductor switch supported on said slide guide substantially equidistant from the edges thereof.

6. The solid state switch as set forth in claim 2 wherein said magnetic means comprises a pair of magnets fixedly mounted on said magnetic actuator means in opposed relation relative to each other each on opposite sides of said opening provided in said magnetic actuator means.

7. The solid state switch as set forth in claim 2 wherein said force applying means comprises a push button having a substantially planar, force applying surface and a stem depending therefrom supported within said opening in said outwardly extending projection of said housing for movement relative thereto, and a retainer button having a bearing surface operatively engaged with said magnetic actuator means for imparting movement thereto and a stem having one end thereof attached to said bearing surface and the other end thereof affixed to said stem of said push button wherein a force applied to said planar surface of said push button is transmitted through said retainer button to said magnetic actuator means to cause movement thereof.

8. A solid state switch operable for accomplishing an electrical switching function comprising:

a. a base assembly;

b. externally accessible terminal means comprising a plurality of conductor leads supported on and extending outwardly from said base assembly operable for connecting the solid state switch in electrical circuit relation in an electrical circuit;

c. guide means mounted on said base assembly and extending outwardly therefrom;

d. a field sensitive switching element mounted on said guide means operable in response to exposure to changes in magnetic flux density to produce corresponding electrical outputs;

e. a magnetic actuator having an opening formed at least partially therethrough for receiving at least a portion of said guide means therewithin for supporting said magnetic actuator on said guide means for movement relative thereto;

f. magnetic means provided on said magnetic actuator with at least a portion of said magnetic means located on either side of said opening in said magnetic actuator, said magnetic means comprising at least two cross coupled magnetic pole pairs operable to produce a standing magnetic wave; and g. force applying means operatively engaged with said magnetic actuator and actuatable for producing relative movement between said magnetic actuator and said guide means wherein when said guide means in response to actuation of said force applying means occupies a first position relative to said opening in said magnetic actuator said magnetic means bears a first relationship to said field sensitive switching element thereby exposing said field sensitive switching element to a first level of magnetic flux density to establish a first operating condition of said field sensitive switching element thereby causing a first form of output to be provided from the solid state switch, and when said guide means in response to the unactuation of said force applying means occupies a second position relative to said opening in said magnetic actuator said magnetic means bears a second relationship to said field sensitive switching element thereby exposing said field sensitive switching element to a second level of magnetic flux density to establish a second operating condition of said field sensitive switching element thereby causing a second form of output to be provided from the solid state switch.

9. The solid state switch as set forth in claim 8 wherein said guide means comprises a slide guide fixedly mounted on said base assembly and extending outwardly therefrom substantially at right angles thereto, and said field sensitive switching element comprises a Hall-effect semiconductor switch supported on said slide guide substantially equidistant from the edges thereof.

10. The solid state switch as set forth in claim 8 wherein said force applying means comprises a push button having a substantially planar, force applying surface and a stem depending therefrom, and a retainer button having a bearing surface operatively engaged with said magnetic actuator for imparting movement thereto and a stem having one end thereof attached to said bearing surface and the other end thereof affixed to said stem of said push button wherein a force applied to said planar surface of said push button is transmitted through said retainer button to said magnetic actuator to cause movement thereof.

* * * * *